Patented Dec. 28, 1937

2,103,805

UNITED STATES PATENT OFFICE 2,103,805

CONTROL SYSTEM FOR ELECTRIC MOTORS

Harold W. Williams, Chicago, Ill., assignor to Westinghouse Electric Elevator Company, Chicago, Ill., a corporation of Illinois Application November 7, 1936, Serial No. 109,685

18 Claims. (Cl. 172—152)

My invention relates to control systems for electric motors, and more particularly to control systems for tandem alternating current motor drives for elevator cars.

One object of my invention is to provide a control system for a tandem drive which will effect uniform acceleration and deceleration of the speed of an elevator car regardless of its varying loads.

Another object is to provide a control system for tandem drives which will effect such rates of acceleration and deceleration of an elevator car as will provide the passengers with the most comfortable rate of change of speed; that is without bumping or jerking the car by sudden changes in the rate of speed.

A further object is to provide a control system which will insure the completion of the dynamic braking through the motors before the mechanical brakes are applied to finally stop the car and to thereby save wear and tear on the mechanical brakes and insure smooth and comfortable operation of the car for the passengers.

It is also an object to provide a control system for tandem motor drives which will not increase the cost of such drives very greatly but which will increase their efficiency to such an extent that they may be utilized in many places where it is desirable to have a well controlled drive but which do not seem to warrant the expense of the finer and the more accurate drives such as the variable voltage drives. Heretofore, tandem drives have been employed mostly where it is desired to install low speed systems, and where the rate of acceleration and deceleration of the car is not of the highest importance, at least not of sufficient importance to warrant the expenditure of a considerable outlay for a very fine accurate drive. The present invention will enable the users to embody the economical tandem drive in many installations where heretofore it would have been necessary to employ a much more expensive drive.

Broadly, the invention relates to a tandem alternating current motor drive for an elevator car in which a generator is arranged to be so driven by a motor shaft that its output voltage will correspond to the speed of the movement of the car in its hatchway and in which a plurality of relays are provided and made responsive to said output voltage for the purpose of controlling the acceleration and deceleration of the car in accordance with the load on the car.

Figure 1:
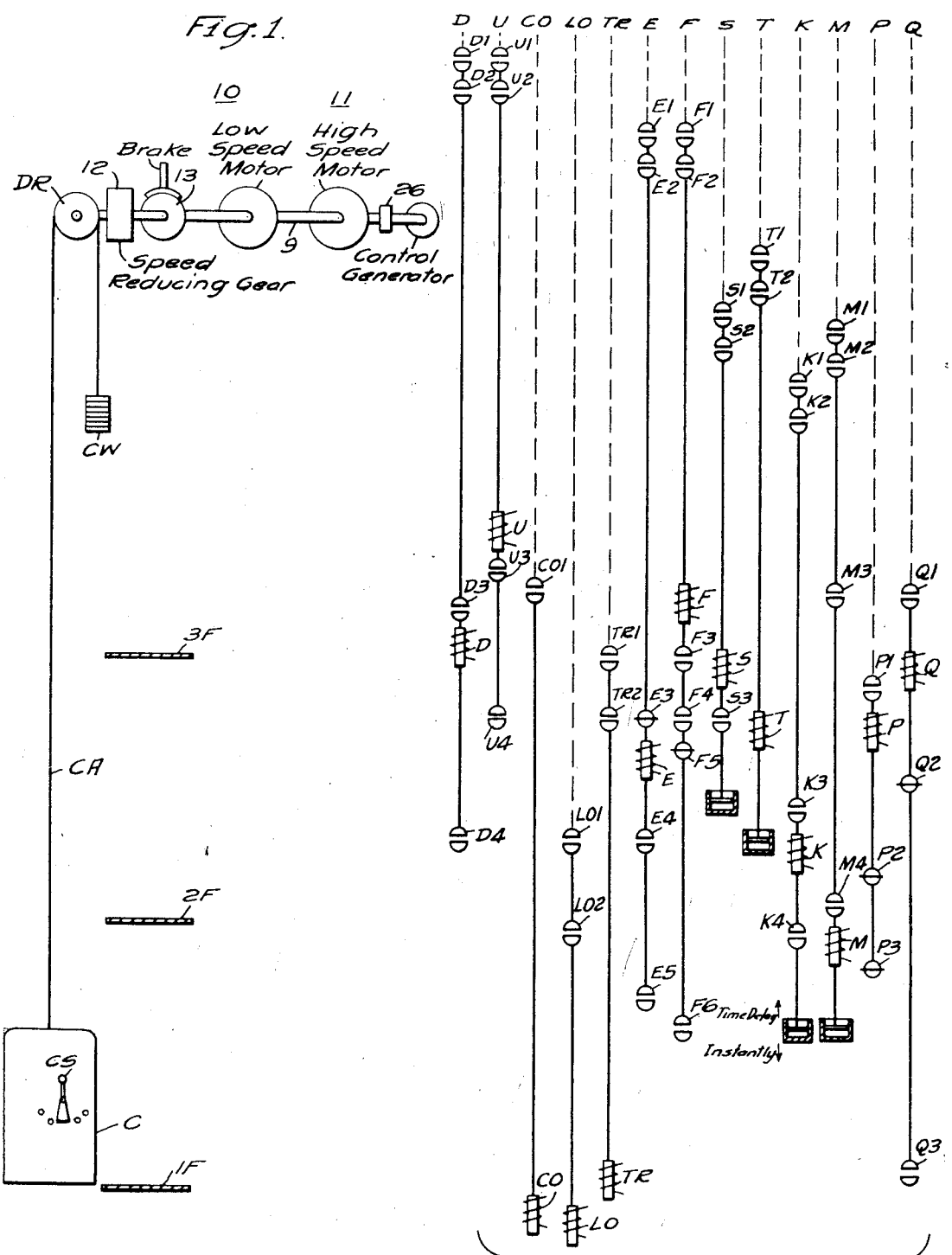
Figure 2:
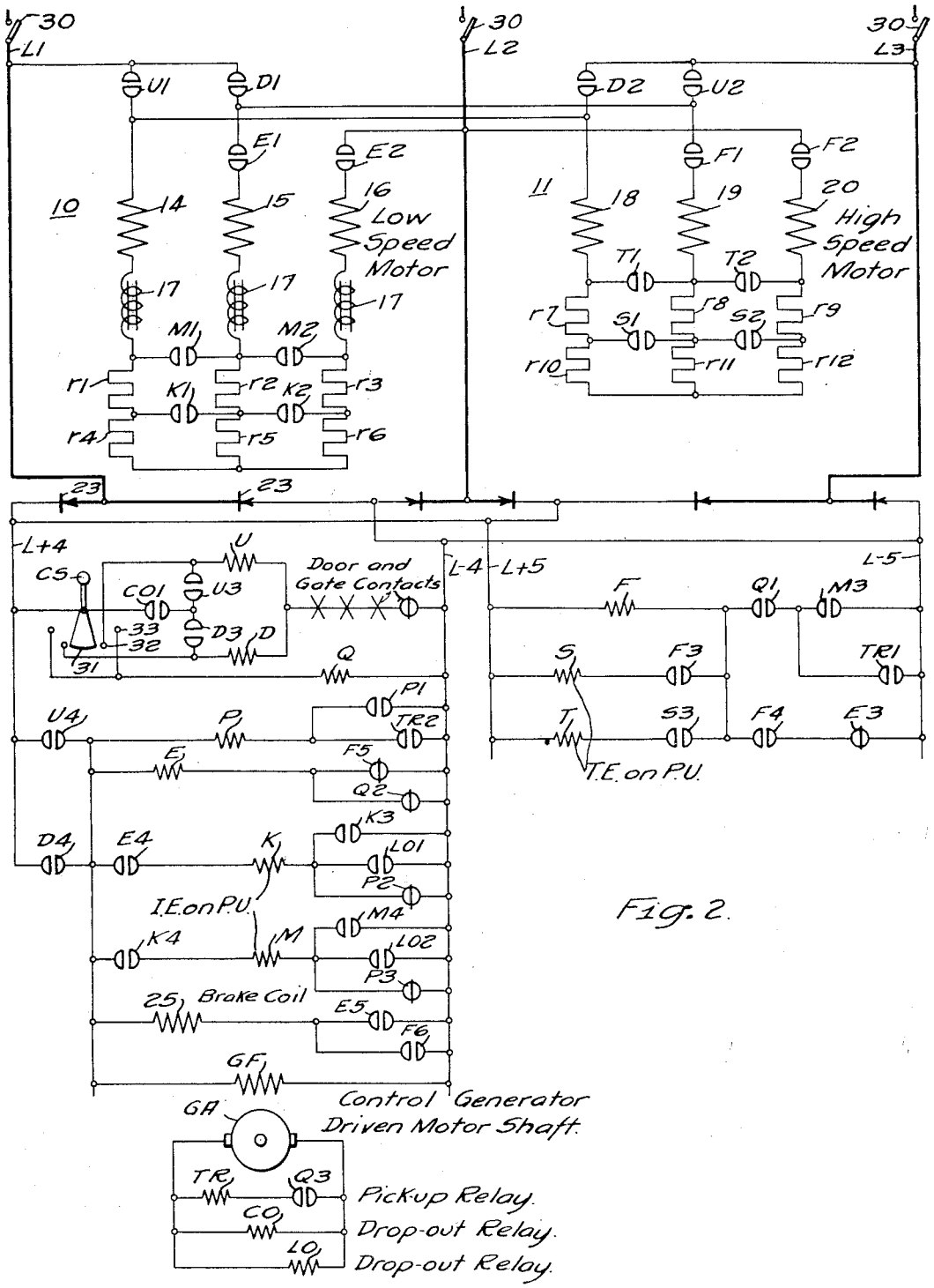

For a better understanding of the invention, reference may be had to the accompanying drawings, in which:

Figure 1 represents an elevator system provided with a tandem alternating current motor drive controlled in accordance with my invention, Fig. 2 is a diagrammatic representation of the electrical circuits used in controlling the tandem drive. These circuits are drawn as what is known the "straight line" style; and, Fig. 2A is a representation of the relays embodied in Fig. 2 with their coils and contact members disposed in horizontal alignment with their positions in the straight line circuits, so that the reader may readily determine the identity of any relay, the number and kind of its contact members and the position of its coil and its contact members in the straight line circuits.

CS=car switch
U= up direction switch
D= down direction switch
CO= cut off relay or drop out relay
LO= lockout relay or drop out relay for controlling retardation in accordance with load
TR=transfer relay—transfers from one motor to the other motor
E= control relay for low speed motor
F= control relay for high speed motor
K= first sequence time delay relay for first resistance of low speed motor
M= second sequence time delay relay for second resistance of low speed motor
S= first sequence time delay relay for first resistance of high speed motor
T= second sequence time delay relay for second resistance of high speed motor
P= sequence control relay
Q= high speed preparing relay.

Referring more particularly to the drawings, I have illustrated an elevator car A as suspended by a cable CA passing over a hoisting drum DR to a counterweight CW. The drum DR is mounted on a shaft 9 driven by a low speed motor 10 and a high speed motor 11. A speed reducing gear 12 is provided for securing the desired speed of the driving drum by the operation of the motors and an electro-magnetic brake 13 is provided for stopping and holding the car at the floor landing, such as F, when a stop is made.

The low speed motor 10 is provided with circuits comprising three phase windings 14, 15 and 16 and a plurality of control resistors $r1$, $r2$, $r3$, $r4$, $r5$ and $r6$. A plurality of reactance coils 17 are provided for limiting the current to a value which will give a smooth operation of the motor under certain operating conditions. The high speed motor 11 is provided with circuits comprising three phase windings 18, 19 and 20 controlled by a plurality of resistors r7, r8, r9, r10, r11 and r12. Although these motors may be designed for any suitable speed, it will be assumed that those here indicated are so designed that the slow speed motor will have a normal high speed rotation of about 100 R. P. M. and a high speed rotation of about 600 R. P. M. The motors are mounted on the common shaft 9, so that they rotate simultaneously. Therefore, it must be understood that the slow speed motor, when energized, will rotate the shaft at about 100 R. P. M. and that energization of the high speed motor will increase the rotation of the shaft 9 to about 600 R. P. M. The motors may be provided with alternating current energy from any suitable source through the supply conductors L1, L2 and L3.

A suitable source of direct current for the control system and its relays is provided through the use of a plurality of rectifiers represented by the plates 23 between the alternating current supply conductors L1, L2 and L3 and a plurality of direct current conductors L+4 and L—4 and L+5 and L—5.

In order that the motors may be controlled to operate the car as desired, it is provided with a car switch CS for energizing an up direction switch U, a down direction switch D and a high speed preparing relay Q. The low speed motor is provided with a control relay E which may be energized by operation of either of the direction switches for connecting the phase windings of the motor 10 to the supply conductors L1, L2 and L3 and for also setting in operation a first sequence relay K and a second sequence relay M for shorting out the resistors r1 to r6 at desired points in starting and accelerating or decelerating the motor 10. The relays K and M are time delay relays and should be so constructed that they will close after the expiration of a predetermined period of time after being energized. This delay may be any desired period that will short out the resistors at such times as will secure the desired operation of the motor. It will be noted that the relay K is first energized and that it thereupon completes a circuit for energizing the relay M so that they operate in due sequence.

A control relay F is provided for the high speed motor and it is designed to control a first sequence relay S and a second sequence relay T which operate to short out the resistors r7 to r12 in the circuits of the motor 11 at such times as will effect the desired control in the acceleration and deceleration of that motor. The relays S and T are also so designed that they will operate after a predetermined time after being energized, and they should be so constructed that their time delay will connect and disconnect the resistors r7 to r11 at the desired times to control the motor 11 as desired. It will be noted that the relay S controls the energization of the relay T, so that the relay S is first energized and after it operates, the relay T then becomes energized, so that they operate in due sequence in connecting and disconnecting the resistors.

The control relays E and F are also provided with contact members which control the energization of the coil of the brake 13, so that the brake will be released from the shaft 9 when either motor is energized for operation and will be deenergized and applied to the shaft to stop and hold the car at a landing when both motors are deenergized.

A sequence control relay P is provided for controlling the operation of the sequence relays K and M.

In the operation of tandem alternating current motor drives, it has been found very difficult to arrange for accelerating the low speed motor up to a certain speed, then transferring the operation of the car from the low speed motor to the high speed motor and accelerating it to its full high speed and again decelerating the car to stop it in a satisfactory manner. In order to secure the desired acceleration and deceleration and to transfer the operation of the car from the low speed motor to the high speed motor or from the high speed motor to the low speed motor in the most desirable manner, I have provided a novel arrangement of a generator G and a transfer relay TR, a cut-off relay CO and a lockout relay LO.

The generator G is so connected to the supply conductors L+4 and L—4 that it will be energized for operation when either the up direction switch U or the down direction switch D is closed to start the car in operation. The armature GA is connected to the drive shaft 9, so that it is rotated whenever the car is in operation. A speed increasing gear 26 is provided for so connecting the control generator armature to the shaft 9 that it will be rotated at a predetermined speed in accordance with the rotation of the shaft and hence in accordance with the speed of the car. Therefore, with the field winding GF energized by a constant direct current and the armature GA rotating in accordance with the speed of the car, the electrical voltage generated by the generator will be proportional to the speed of the car. This voltage is used for controlling the operation of the transfer relay TR and the control relays CO and LO. The transfer relay TR is so constructed that it will pick up or operate whenever the current provided by the generator reaches a predetermined value. By reason of this predetermined pick up, the transfer relay may be used for transferring the operation of the car from the low speed motor to the high speed motor whenever the car reaches a predetermined speed. Conversely, the transfer relay TR will drop out for the purpose of transferring the car from the high speed motor to the low speed motor whenever the car decelerates to a selected speed. The CO relay is designed to pick up and operate when the car assumes approximately 35% of its full high speed and to drop out when the car gets down to approximately 20% of its full speed. When this relay drops out after the car switch has been centered, it acts to deenergize the direction switches which, in turn, effect the application of the brake 13 to stop the car.

The lockout relay LO is designed to pick up when the car reaches approximately 90% of its full high speed and to drop out when the car drops down to approximately 80% of its full speed. If this relay drops out before the first sequence relay K operates after being energized, it will prevent energization of relay K and the consequent shorting out of resistors r4, r5 and r6.

The invention will be better understood by the following assumed operation of the apparatus and circuits illustrated in the drawings. Assume that the car C is standing at the floor landing 1F and that the line switches 30 are closed, thereby energizing the supply conductors L+4 and L—4 through the rectifiers 23. Assume, also, that the car is empty and that the attendant, desirous of operating it in the up direction, moves the car switch CS in a counter-clockwise direction to its full on position for the purpose of starting the car and running it upward at full speed.

This operation of the switch CS closes its contact members 31, 32 and 33 to energize the up direction switch U and the high speed preparing relay Q. The energization of the up direction switch U closes its contact members U1, U2, U3 and U4. The closing of the contact members U1 and U2 prepares the connections of the low speed motor and the high speed motor for connection to the supply conductors L1, L2 and L3. The closing of the contact members U3 prepares but does not complete a self-holding circuit for the up direction switch. The closing of the contact members U4 energizes the field winding GF of the generator G for control purposes and also the coil of the control relay E for effecting the starting of the low speed motor. The energized relay E closes its contact members E1, E2, E4 and E5 and opens its contacts E3. The closing of the contact members E1 and E2 connects the low speed motor 10, through its resistors r1 to r6, to the supply conductors L1, L2 and L3 and the closing of the contact members E5 releases the brake 13. The low speed motor now starts in operation and the car starts slowly to leave the landing 1F. The closing of the contact members E4 energizes the sequence relay K but by reason of its time delay, it does not yet operate. It will be recalled that this relay K is provided with a time delay for the purpose of effecting the shorting of the resistors in the slow speed motor circuit in timed steps to effect a timed step acceleration of the motor.

Inasmuch as the car is empty, it accelerates quickly and soon reaches a speed corresponding to 90% of the full normal speed of the low speed motor. Inasmuch as the shaft 9 of the low speed motor is rotating the armature GA of the control generator at a speed corresponding to the speed of the car and the generator field winding GF is receiving a constant supply of direct current energy from the supply conductors L+4 and L−4, the output voltage of the generator corresponds to and is a measure of the speed of the car.

Inasmuch as the transfer relay TR is so designed that it becomes energized when the generator G is operated by the car running at a speed corresponding to 90% of the full low speed of the low speed motor, and the car has now reached that speed, that relay is energized sufficiently to close its contact members TR1 and TR2. The closing of the contact members TR2 energizes the sequence control relay P to close its contact members P1 and open its contact members P2 and P3 for preventing further energization of the sequence relays K and M, inasmuch as the time delay of relay K has prevented them from being operated by this time. Hence, it is apparent in this instance that the generator G, by operating the relays TR and P, has eliminated the timed step acceleration of the low speed motor because the empty car has already accelerated to the desired speed at which it is to be transferred to the high speed motor. The opening of the contact members P1 and P2 also prevents energization of the relays K and M upon deceleration of the car, until the drop out relay LO operates.

The closing of the contact members TR1 of the transfer relay now energizes the control relay F to effect the transfer of the driving operation of the car from the low speed motor to the high speed motor. The energized relay F closes its contact members F1, F2, F3, F4 and F6 and opens its contact members F5. The closing of the contact members F1 and F2 connects the windings 18, 19 and 20 through the resistors r7 to r12 to the supply conductors L1, L2 and L3 and this motor starts in operation to increase the speed of the car to its full high speed. The closing of the contact members F3 energizes the sequence relay S, but it does not yet become actuated because of its time delay characteristic. The opening of the contact members F5 deenergizes the control relay E which thereupon opens its contact members E1 and E2, thus deenergizing the slow speed motor 10 by disconnecting it from its source of supply.

It should also be noted at this point that the energization of the relay F at this time through the operation of the transfer relay TR caused the relay E to be deenergized and open its contact members E4, thereby deenergizing the relay K before the expiration of its time delay and before it had shorted out the resistors r4, r5 and r6. This happened because, the car being empty, the slow speed motor was able to cause it to easily come up to a speed corresponding to 90% of the full speed of the low speed motor and thereby operate the transfer relay TR to effect the transfer of the car from the low speed motor to the high speed motor.

It will be assumed now that the operation of the high speed motor causes the car to increase its speed until it corresponds to 35% of the full high speed of the high speed motor. At this speed, the operation of the generator G increases its output to such a value that the relay CO is operated to now set up a self-holding circuit by means of contact members CO1 for the direction relay U.

As the car proceeds in operation, the predetermined time of delay for the sequence relay S expires and that relay is actuated to close its contact members S1 and S2, thereby shorting out the resistors r10, r11 and r12 in the control circuit of the high speed motor 11, thus causing that motor to increase its speed. The actuation of the relay S also closes its contact members S3 which thereby energize the sequence relay T to prepare it for operation after the expiration of a predetermined period.

Assuming that the car now gets up to 90% of its full speed, this speed causes the voltage of the generator G to increase to such an extent that the lockout relay LO is energized to close its contact members LO1 and LO2 to prepare for deceleration of the car when it is to be stopped.

As the car proceeds, the predetermined time for the operation of the sequence relay T expires and it is now actuated to close its contact members T1 and T2, thereby shorting out the resistors r7, r8 and r9 in the control windings of the high speed motor 11, thus causing the car to increase its speed, so that the empty car now reaches approximately 103% of its full high speed, because of the fact that the counterweights CW being heavier than the empty car drive the motor 11 above its normal speed.

At this point, it will be assumed that the attendant centers the car switch CS for a stop at the next floor. This centering operation opens the contact members 31 and 32 for the up direction switch U but, because of the closed contact members CO1 of the cut-out relay CO, the up direction switch U will remain closed until the cut-out relay is deenergized by the deceleration of the car to its stopping speed. The centering of the car switch starts automatic deceleration of the car to a stop because it also opens its contact members 31 and 33 and thereby deenergizes the high speed preparing relay Q which, in turn, closes its contact members Q2 and thereby energizes the control relay E to reenergize the low speed motor and subsequently deenergize the high speed motor. The energized relay E closes its contact members E1 and E2 for reenergizing the low speed motor 10, closes its contact members E4 to start the sequence relays K and M and opens its contact members E3 to deenergize the control relay F and the sequence relays S and T which, in turn, deenergizes the high speed motor.

The car is now decelerating rapidly by reason of the deenergization of the high speed motor and the reenergization of the low speed motor. The electrodynamic effect of that motor, while it is being operated by the car at a speed greater than its normal speed, controls the deceleration. As the car decelerates, the time delay on the sequence relay K expires and that relay closes its contact members K1 and K2, thereby shorting out the resistors $r4$, $r5$ and $r6$, thus causing a greater dynamic braking effect in the low speed motor. The actuation of the relay K also closes its contact members K4, thereby energizing the time delay relay M and, as the car decelerates to a still lower speed, the time delay of the relay M expires and it is actuated to open its contact members M1 and M2, thereby shorting out the resistors $r1$, $r2$ and $r3$ in the low speed motor circuit, so that this motor now further increases its dynamic braking effect on the car.

As the car decreases its speed to approximately 80% of its full normal speed, the voltage output of the generator G reaches such a value that the lockout relay LO is deenergized to return it to its normal condition. This deenergization of the relay LO does not affect the sequence relays K and M because they completed self-holding circuits for themselves when they operated.

As the car decelerates to approximately 20% of its full speed, the output of the generator G drops to a corresponding value and thereupon the cutout relay CO is operated to open its contact members CO1 and thereby deenergize the up direction relay U to stop the car. As the up direction relay U is deenergized, it opens its contact members U1, U2 and U4, thereby deenergizing the motors to stop the car and deenergizing the coil 25 to apply the brake 13 to bring the car to a full stop at the next landing 2F.

By the foregoing operation, it is seen that an empty car will be automatically accelerated up to its full normal speed at a desirable rate of acceleration simply by the operation of the car switch to its full "on" position in the up direction; that the transfer of the car from the low speed motor to the high speed motor will be effected at the right time by the automatic operation of the transfer relay TR through the effect of the generator G, and that the sequence relays will control the connection of the resistors in the circuits of the low speed motor and the high speed motor in accordance with the speed of the car.

For purposes of comparison and to make the invention more easily understood, the same operation will now be assumed with the car bearing a heavy load. A heavy load affects the speed of the car because tandem drives do not of themselves provide for the best speed regulation.

It will be assumed that the car switch CS is again moved counter-clockwise to its full "on" up position, that the up direction switch U and the high speed preparing relay Q are both energized, and that the energization of the up direction switch U effects the energization of the field winding of the generator G and the energization of the control relay E as described in the previous operation. The energized relay E energizes the sequence relay K but, because of its time delay characteristic, this relay does not operate immediately. Inasmuch as the car has a heavy load, it accelerates slowly, and, therefore, after a predetermined time, the relay K operates to close its contact members K1 and K2 thereby shorting out the resistors $r4$, $r5$ and $r6$, thus increasing the power of the low speed motor and causing the car to increase its speed. The operation of relay K also closes its contact members K4, thus energizing the sequence relay M, but because of its time delay, it does not operate immediately. The heavy load on the car still causes it to decelerate more slowly than it did in the previously described operation with no load. Therefore, before the car gets up to a sufficient speed to bring in the transfer relay TR, the relay M operates and shorts out the resistors $r1$ and $r2$ in the control circuit of the low speed motor, thereby again increasing the power of that motor and causing the speed of the car to increase. However, the speed of the car has not yet increased to approximately 90% of the full speed of the low speed motor (at which the transfer relay TR normally operates for an empty car), but it will be noted that the operation of the relay M closes its contact members M3, thereby acting to effect the transfer of the car from the low speed motor to the high speed motor. This operation is effected because the closed contact members M3 energize the control relay F which closes its contact members F1 and F2, thereby energizing the high speed motor as previously described. This relay also closes its contact members F3, thereby energizing the sequence relay S. At the same time it opens its contact members F5 and thereby deenergizes the low speed motor control relay E which opens its contact members E1 and E2 and thereby deenergizes the low speed motor. In this manner, the car, because of its heavy load and slow acceleration, is transferred from the low speed motor to the high speed motor without waiting for the transfer relay to be energized by the control generator.

Hence, it is seen that the control system controls the acceleration of the car in accordance with its tendency to fast acceleration with no load and its tendency to slow acceleration with a heavy load, so that the acceleration of the car is maintained at a desirable and comfortable rate of speed regardless of its load.

The car now continues its acceleration and as it reaches 90% of its full low speed, the output of the generator G reaches such a value that it operates the transfer relay TR which thereupon closes its contact members TR2 for energizing the sequence control relay P which opens its contact members P2 and P3 to prevent future reenergization of the sequence relays K and M when the car is decelerating until such a time as the lockout switch is energized.

With the car being operated by the high speed motor, which now arrives at approximately 35% of its full high speed, at which point the output value of the generator G energizes the cut-off relay CO to prepare it for service in stopping the car and applying the mechanical brake when a landing is to be served.

The time delay period for the sequence relay S has now expired and it actuates to close its contact members S1 and S2, thereby shorting the resistors $r10$, $r11$ and $r12$ in the circuit of the high speed motor, thereby increasing the speed of the car. At the same time, the relay S closes its contact members S3, thus energizing the time delay sequence relay T. After the expiration of the time delay, the relay T closes its contact members T1 and T2, thereby shorting the resistors $r7$, $r8$ and $r9$ in the circuit of the high speed motor, thus increasing the speed of that motor to increase the speed of the car.

As the speed of the car increases to 90% of its full high speed, the output of the generator G reaches such a value that it energizes the lockout relay LO to prepare it for controlling the deceleration of the car when a stop is to be made.

Inasmuch as the car is heavily loaded, it does not increase to quite the high speed that it did when it had no load. However, it will be assumed that it reaches 95% of its full high speed with the acceleration so far described. At this time, the car switch is centered for the next stop, thereby deenergizing the high speed preparing relay Q which starts the control system into a sequence of actions, controlled by the lockout relay LO, which will cause the car, with its heavy load, to decelerate at a desirable rate and then stop accurately at the next landing.

The deenergized relay Q closes its contact members F5, thereby energizing the control relay E which closes its contact members E1 and E2 to reenergize the low speed motor. At the same time, the relay E opens its contact members E3, thereby deenergizing the relays F, S and T. The deenergized relay F opens its contact members F1 and F2, thus deenergizing the high speed motor. Hence, it is seen that this operation transfers the heavily loaded car from the high speed motor to the low speed motor and that the low speed motor now effects deceleration of the car by reason of the effect of its dynamic braking action. At the time the relay E was energized, it closed its contact members E4, thereby energizing the sequence relay K. As stated before, this relay K has a time delay period after which it will be operated to actuate its contact members. In describing the operation of the car with no load, this period passed and the relay K shorted out its associated resistors. However, in the present case the car is heavily loaded, and, therefore, starts to decelerate rapidly. Therefore, in accordance with my invention, as soon as the car decelerates to 80% of full high speed, the output of the generator G decreases to such an extent that it deenergizes the lockout relay LO thereupon opens its contact members LO1 and deenergizes the sequence relay K. It should be observed that this action of the relay LO takes place before the expiration of the time delay period of the relay K and that hence the relay K does not in this operation actuate its contact members K1 and K2. Therefore, the resistors $r4$, $r5$ and $r6$ are not shorted out of the circuit for the low speed motor at this time and that the motor provides a less dynamic braking effect for the heavily loaded car than it did for the car when it was not loaded.

As the car decelerates and drops to 20% of its full speed, the output of the generator G drops to the point where it deenergizes the cut-off relay CO, which thereupon opens its contact members CO1 in the self-holding circuit of the up direction relay U, which, in turn, deenergizes the relay E to disconnect the low speed motor from its supply of energy and to also restore the relay P to its normal deenergized condition. As the up direction switch U is deenergized, it opens its contact members U4 and thereby energizes the brake coil 25 to permit the operation of the mechanical brake 13 which brings the car to a stop. As the car stops, the generator G stops and its drop in output value causes the transfer relay TR to be deenergized and restored to its normal deenergized position.

By reason of the foregoing operation, it is seen that I have provided an economical control system for a tandem motor drive for elevators and that the system will operate to control the acceleration and deceleration of the elevator car in accordance with the loading of the car, thereby providing a pleasant and agreeable rate of acceleration and deceleration for the passengers.

Although I have illustrated and described only one specific embodiment of the invention, I desire it to be understood that many changes therein and modifications thereof may be made without departing from the spirit and scope of the invention.

I claim as my invention:

1. In a control system for an electric motor, retarding circuits for the motor, means for controlling the amount of resistance in the retarding circuits, a generator, and means responsive to the speed of the generator for controlling the resistance controlling means.

2. In a two speed alternating current motive means, a generator, means responsive to operation of the motive means for driving the generator at a speed proportional to the speed of the motive means, circuits for the motive means, means for controlling the amount of resistance in the circuits of the motive means, and means responsive to the speed of the generator for controlling the resistance controlling means.

3. In a control system for operating a power driven device, a low speed and high speed electrical means for driving the device, a switch, resistance circuits for the driving means, means responsive to operation of the switch for connecting the driving means to a source of electrical energy and for automatically controlling the resistance circuits in a predetermined manner to effect a predetermined rate of acceleration of the driving means and the device, and means, including a generator, responsive to acceleration of the device to a predetermined speed within a predetermined time for causing the resistance controlling means to operate the resistance circuits to maintain said predetermined rate of acceleration until the device reaches its normal high speed.

4. In a control system for operating an elevator car in a hatchway, a low speed and a high speed motive means for driving the car, a starting switch, resistance circuits for said motive means, means responsive to operation of the starting switch for controlling the resistance circuits to effect a predetermined acceleration of the motive means and the car, and means, including a generator, responsive to operation of the car at a predetermined speed for controlling said resistance controlling means to insure the operation of the car at approximately said predetermined rate of acceleration.

5. In a control system for operating an elevator car in a hatchway, a low speed and a high speed motive means for driving the car, a switch, resistance circuits for the motive means, means responsive to operation of the switch for connecting the motive means to a source of electric energy and for operating the resistance circuits in a predetermined manner to effect a predetermined acceleration of the car, a generator, means responsive to operation of the car for operating the generator at a speed corresponding to the speed of the car, and means responsive to a predetermined speed of the generator for controlling the resistance controlling means to maintain said predetermined acceleration of the car.

6. In a control system for operating an elevator car in a hatchway, a low speed and a high speed motive means for driving the car, a switch, resistance circuits for the motive means, means responsive to operation of the switch for connecting the motive means to a source of electric energy and for operating the resistance circuits in a predetermined manner to effect a predetermined acceleration of the car, a generator having an armature and a field winding, means for connecting the field winding to a constant direct current supply of energy, means responsive to operation of the car for operating the armature at a speed corresponding to the speed of the car, and means responsive to a predetermined output voltage of the generator for controlling the resistance controlling means to maintain said predetermined acceleration of the car.

7. In a control system for operating an elevator car in a hatchway, a low speed and a high speed motive means for driving the car, a plurality of resistors connected in circuit with the motive means, a switch, electromagnetic means responsive to operation of the switch for connecting the motive means with a source of electric energy for operating the car, electromagnetic control means responsive to operation of the switch for disconnecting one of said resistors from said circuit at a predetermined time during acceleration of the motive means to secure a predetermined acceleration of the car, a generator, means responsive to operation of the car for operating the generator at a speed corresponding to the speed of the car, and means responsive to the generator reaching a predetermined voltage output within a predetermined time for preventing the electromagnetic control means from operating to disconnect said one resistor from said circuit whereby the said predetermined acceleration of the car is maintained.

8. In a control system for operating an elevator car in a hatchway, a low speed and a high speed motive means for driving the car, a plurality of resistors connected in circuit with the motive means, a switch, electromagnetic means responsive to operation of the switch for connecting the motive means with a source of electric energy for operating the car, electromagnetic control means responsive to operation of the switch for disconnecting one of said resistors from said circuit at a predetermined time during acceleration of the motive means to secure a predetermined acceleration of the car, a generator, means responsive to operation of the car for operating the generator at a speed corresponding to the speed of the car, and transfer means responsive to the generator reaching a predetermined voltage output within a predetermined time for preventing operation of the electromagnetic control means to disconnect a resistor from said low speed motive means, and for disconnecting the low speed motive means from said supply of energy and for connecting the high speed motive means to said supply of energy for transferring the car from the one to the other for maintaining a predetermined acceleration of the car.

9. In a control system, an electric motor for operating a device, a retarding resistor connected to the motor circuit, a switch, means responsive to operation of the switch for connecting the motor to a source of electric energy, electromagnetic means responsive to operation of the switch for disconnecting the retarding resistor from said circuit after the expiration of a predetermined time during acceleration of the device, a generator, means responsive to operation of the device for operating the generator, and means responsive to the generator reaching a predetermined voltage output within a predetermined time for preventing the electromagnetic means from operating to disconnect said retarding resistor from said circuit for maintaining a predetermined acceleration of said device.

10. In a control system for operating an elevator car by a low speed motor and a high speed motor, a switch, means responsive to operation of the switch for connecting the low speed motor to a source of electrical energy and for preparing the high speed motor for connection to said source of energy to operate the car, a generator, means responsive to operation of the car for operating the generator in accordance with the speed of the car, and means responsive to the generator reaching a predetermined speed within a predetermined time for disconnecting the slow speed motor from the source of energy and for completing the connection of the high speed motor to the source of energy for the purpose of transferring the operation of the car from the low speed motor to the high speed motor.

11. In a control system for operating a power driven device, an electric motor for driving the device, retarding circuits for the motor, a switch, means responsive to operation of the switch to its "on" position for connecting the motor to a source of electrical energy for accelerating the device to its normal running speed and responsive to operation of the switch toward its "off" position for effecting deceleration of the device, means for stopping the device, means responsive to operation of the switch to its "off" position for controlling the retarding circuits to effect a predetermined deceleration of said device, and means responsive to deceleration of the device to a predetermined speed within a predetermined time for controlling the retarding circuit controlling means to maintain said predetermined deceleration of the device.

12. In a control system for operating a power driven device, an electric motor for driving the device, retarding circuits for the motor, a switch, means responsive to operation of the switch to its "on" position for connecting the motor to a source of electrical energy for accelerating the device to its normal running speed and responsive to operation of the switch toward its "off" position for effecting deceleration of the device, means for stopping the device, means responsive to operation of the switch to its "off" position for controlling the retarding circuits to effect a predetermined deceleration of the said device, means responsive to deceleration of the device to a predetermined speed within a predetermined time for controlling the retarding circuit controlling means to maintain said predetermined deceleration of the device, and means responsive to the device decelerating to a predetermined speed for applying the stopping means to stop the device.

13. In a control system for operating a power driven device, an electric motor for driving the device, retarding circuits for the motor, a switch, means responsive to operation of the switch to its "on" position for connecting the motor to a source of electrical energy for accelerating the device to its normal running speed and responsive to operation of the switch toward its "off" position for effecting deceleration of the device, means for stopping the device, and means responsive to the device decelerating to a predetermined speed for actuating the stopping means to stop said device.

14. In a control system for operating an elevator car in a hatchway, a two speed alternating current motive means, a switch, means responsive to operation of the switch toward its "on" position for connecting the motive means to a source of electrical energy for starting and accelerating the car to a normal operating speed and responsive to operation of the switch toward its "off" position for decelerating the car from said normal speed, a retarding circuit for the motive means, means responsive to operation of the switch for controlling the retarding circuit in step-by-step sequence to effect deceleration of the car at a predetermined rate, a generator, means responsive to operation of the car for operating the generator at a speed corresponding to the speed of the car, means responsive to the generator decelerating to a predetermined speed within a predetermined time for controlling the retarding circuit control means to maintain the deceleration of the car at said predetermined rate, and means for stopping the car.

15. In a control system for operating an elevator car in a hatchway, a two speed alternating current motive means, a switch, means responsive to operation of the switch toward its "on" position for connecting the motive means to a source of electric energy for starting and accelerating the car to a normal operating speed and responsive to operation of the switch toward its "off" position for decelerating the car from said normal speed, a retarding circuit for the motive means, means responsive to operation of the switch for controlling the retarding circuit in step-by-step sequence to effect deceleration of the car at a predetermined rate, a generator, means responsive to operation of the car for operating the generator at a speed corresponding to the speed of the car, means responsive to the generator decelerating to a predetermined speed within a predetermined time for controlling the retarding circuit control means to maintain the deceleration of the car at said predetermined rate, means for stopping the car, and a relay responsive to the generator decelerating to a predetermined speed for operating the stopping means to stop the car.

16. In a control system for operating an elevator car in a hatchway, a two speed alternating current motive means, a switch, means responsive to operation of the switch toward its "on" position for connecting the motive means to a source of electrical energy for starting and accelerating the car to a normal operating speed and responsive to operation of the switch toward its "off" position for decelerating the car from said normal speed, a retarding circuit for the motive means, means responsive to operation of the switch for controlling the retarding circuit in step-by-step sequence to effect deceleration of the car at a predetermined rate, a generator, means responsive to operation of the car for operating the generator at a speed corresponding to the speed of the car, a stopping means, and a relay responsive to the generator decelerating to a predetermined speed for effecting operation of the stopping means to stop the car.

17. In a control system for operating an elevator car in a hatchway, a low speed and a high speed motive means for driving the car, a switch, means responsive to operation of the switch to its "on" position for connecting the motive means to a source of power to accelerate the car to a normal speed and responsive to operation of the switch to its "off" position for effecting deceleration of the car, a retarding resistor for the motive means, means responsive to operation of said switch for controlling the resistor to effect acceleration and deceleration of the car at predetermined rates, a generator, means responsive to operation of the car for operating the generator at a speed corresponding to the speed of the car, means responsive to the generator accelerating to a predetermined speed within a predetermined time for controlling the resistor controlling means to maintain approximately said predetermined rate of acceleration of the car, and means responsive to deceleration of the generator to a predetermined speed within a predetermined time for controlling the resistor controlling means to maintain the deceleration of the car at approximately said predetermined rate.

18. In a control system for operating an elevator car in a hatchway, a low speed and a high speed motive means for driving the car, a switch, means responsive to operation of the switch to its "on" position for connecting the motive means to a source of power to accelerate the car to a normal speed and responsive to operation of the switch to its "off" position for effecting deceleration of the car, a retarding resistor for the motive means, means responsive to operation of said switch for controlling the resistor to effect acceleration and deceleration of the car at predetermined rates, a generator, means responsive to operation of the car for operating the generator at a speed corresponding to the speed of the car, means responsive to the generator accelerating to a predetermined speed within a predetermined time for controlling the resistor controlling means to maintain approximately said predetermined rate of acceleration of the car, means responsive to deceleration of the generator to a predetermined speed within a predetermined time for controlling the resistor controlling means to maintain the deceleration of the car at approximately said predetermined rate, a stopping means, and additional means responsive to deceleration of the generator to a predetermined speed for operating the stopping means to stop the car.

HAROLD W. WILLIAMS.